US007474969B2

(12) United States Patent
Poulisse

(10) Patent No.: US 7,474,969 B2
(45) Date of Patent: Jan. 6, 2009

(54) METHOD AND SYSTEM FOR PRODUCTION METERING OF OIL WELLS

(75) Inventor: Henk Nico Jan Poulisse, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/666,382

(22) PCT Filed: Nov. 1, 2005

(86) PCT No.: PCT/EP2005/055680

§ 371 (c)(1),
(2), (4) Date: Apr. 26, 2007

(87) PCT Pub. No.: WO2006/048418

PCT Pub. Date: May 11, 2006

(65) Prior Publication Data

US 2007/0295501 A1 Dec. 27, 2007

(30) Foreign Application Priority Data

Nov. 1, 2004 (EP) .................................. 04105442

(51) Int. Cl.
 *E21B 21/08* (2006.01)
(52) U.S. Cl. .............................. 702/45; 702/98; 702/25; 702/100; 166/250.01; 166/250.15; 73/61.44; 73/861.04
(58) Field of Classification Search ................. 702/50, 702/45, 25, 98, 100; 175/25, 48, 66, 207; 166/66, 369, 265, 250.01, 250.15; 73/61.44, 73/200, 861.04, 195
See application file for complete search history.

(56) References Cited

U.S. PATENT DOCUMENTS

| | | | | | |
|---|---|---|---|---|---|
| 4,776,210 | A | * | 10/1988 | Baillie et al. | 73/861.04 |
| 4,813,270 | A | * | 3/1989 | Baillie | 73/861.04 |
| 4,817,439 | A | * | 4/1989 | Arnaudeau et al. | 73/861.04 |
| 4,852,395 | A | * | 8/1989 | Kolpak | 73/61.44 |
| 5,456,120 | A | * | 10/1995 | Simonian | 73/861.04 |
| 5,526,684 | A | * | 6/1996 | Liu et al. | 73/200 |
| 5,777,278 | A | * | 7/1998 | Bednarczyk et al. | 181/102 |
| 5,880,375 | A | * | 3/1999 | Bielski et al. | 73/861.05 |
| 6,032,539 | A | * | 3/2000 | Liu et al. | 73/861.04 |
| 6,128,962 | A | * | 10/2000 | Marrelli et al. | 73/861.04 |
| 6,234,030 | B1 | * | 5/2001 | Butler | 73/861.04 |
| 6,318,156 | B1 | * | 11/2001 | Dutton et al. | 73/61.44 |
| 6,332,111 | B1 | * | 12/2001 | Fincke | 702/50 |
| 6,454,002 | B1 | * | 9/2002 | Stokes et al. | 166/250.15 |
| 6,546,809 | B1 | * | 4/2003 | Andreussi | 73/861.04 |
| 6,561,041 | B1 | * | 5/2003 | Eck | 73/861.04 |
| 6,564,619 | B2 | * | 5/2003 | Dutton et al. | 73/61.44 |

(Continued)

FOREIGN PATENT DOCUMENTS

WO          WO9101481          2/1991

(Continued)

*Primary Examiner*—Carol S Tsai

(57) ABSTRACT

The present invention relates to a method and system for determining multiphase fluid streams flowing from individual wells of a cluster of crude oil, gas and/or other fluid production wells, wherein the fluid streams produced by the individual wells are commingled and routed via a fluid separation assembly into fluid outlet conduits for transportation of at least partly separated streams of crude oil, gas and/or other fluids.

16 Claims, 2 Drawing Sheets

U.S. PATENT DOCUMENTS 6,810,719 B2 * 11/2004 Dutton et al. .............. 73/61.44
7,013,715 B2 * 3/2006 Dutton et al. .............. 73/61.44

FOREIGN PATENT DOCUMENTS

| WO | WO9960247 | 11/1999 |
| WO | WO03046485 | 6/2003 |
| WO | WO2004101956 | 11/2004 |

* cited by examiner

Building Well Models using Well Test Data

METHOD AND SYSTEM FOR PRODUCTION METERING OF OIL WELLS

PRIORITY CLAIM

The present application claims priority from European Patent Application 04105442.0 filed 1 Nov. 2004.

FIELD OF THE INVENTION

The present invention relates to a method and system for determining the contributions of individual wells to the production of a cluster of crude oil, gas and/or other fluid production wells.

BACKGROUND OF THE INVENTION

Typically, multiphase fluid streams produced by individual wells of a well cluster are commingled and routed via a fluid separation assembly (a bulk separator or a production separator) into fluid outlet conduits for transportation of at least partly separated streams of liquids, gas and/or other fluids.

It is known from International patent applications WO 9101481 and WO 9960247 to connect a cluster of wells via a series of multiphase well effluent transportation pipelines commingled to a common bulk fluid separator and to monitor the size and/or composition of the stream of produced multiphase well effluents by means of flow meters that are connected to the fluid outlets of the bulk separator.

The most common well effluents are crude oil, natural gas and water which flow as a multiphase fluid mixture through the well production pipelines in sometimes erratic flow patterns which may quickly change from a stratified into a slug or mist flow pattern.

An advantage of the use of flow meters that are connected to the fluid outlets of the bulk separator is that these outlets contain generally single-phase fluids of which the flow rates can be measured accurately by dedicated liquid or gas flow meters. The flow rates of the commingled produced multiphase well effluents can be measured more accurately and economically using single phase flow meters than by making measurements with multiphase flow meters within the multiphase fluid transportation pipelines upstream of the separation assembly.

A problem associated with measuring fluid flow at the outlets of the bulk separator is that this fluid flow stems from the commingled flux from all the wells of the cluster and does not provide information about the composition and flux of fluids produced by the individual wells. Furthermore, the individual flux of fluids produced by the individual wells is currently not available in real time or instantaneously.

SUMMARY OF THE INVENTION

The present invention includes a method for determining multiphase fluid streams flowing from individual wells of a cluster of crude oil, gas or other fluid production wells, of which the produced fluid streams are commingled and routed via a fluid separation assembly into fluid outlet conduits for transportation of at least partly separated streams of crude oil, gas or other fluids; the method comprising:

arranging a flow meter at each fluid outlet conduit;

producing oil or gas from the cluster of wells and monitoring a dynamic fluid flow pattern of the accumulated multiphase stream of well effluents produced by the cluster of wells by means of the flow meters;

performing a series of well tests during which production from a tested well is varied and production from other wells is maintained substantially constant or interrupted;

monitoring during each well test a dynamic fingerprint of the variation of the flow pattern of effluents produced by the tested well;

assuming that an estimated dynamic flow pattern is an accumulation of said dynamic fingerprints that are multiplied by unknown weight coefficients; and determining the unknown weight coefficients by iteratively varying each weight coefficient until the estimated dynamic fluid flow pattern substantially matches with the monitored dynamic fluid flow pattern.

The present invention includes a system for monitoring a multiphase fluid stream flowing from a cluster of crude oil, gas and/or other fluid production wells via a fluid separation assembly into a plurality of fluid outlet conduits for transportation of at least partly separated streams of crude oil, natural gas and/or other fluids; the system comprising:

a flow meter for monitoring fluid flux in each fluid outlet conduit;

means for storing a dynamic fluid flow pattern of the accumulated multiphase fluid stream produced by the cluster of wells as monitored by the flow meters;

means for performing a series of well tests during which production from a tested well is varied and production from other wells is maintained substantially constant or interrupted;

memory means for monitoring during each well test a dynamic fingerprint of the variation of production characteristics of the tested well;

processor means which take into account that an accumulated fluid stream produced by the cluster of wells has a dynamic flow pattern which is an accumulation of said dynamic fingerprints that are multiplied by unknown weight coefficients; and processor means for determining the unknown weight coefficients by iteratively varying each weight coefficient until the assumed dynamic fluid flow pattern substantially matches with the monitored dynamic fluid flow pattern.

BRIEF DESCRIPTION OF THE DRAWINGS

The invention will be described by way of example in more detail with reference to the accompanying drawings in which.

DETAILED DESCRIPTION OF PREFERRED EMBODIMENTS OF THE INVENTION

Figure 1:
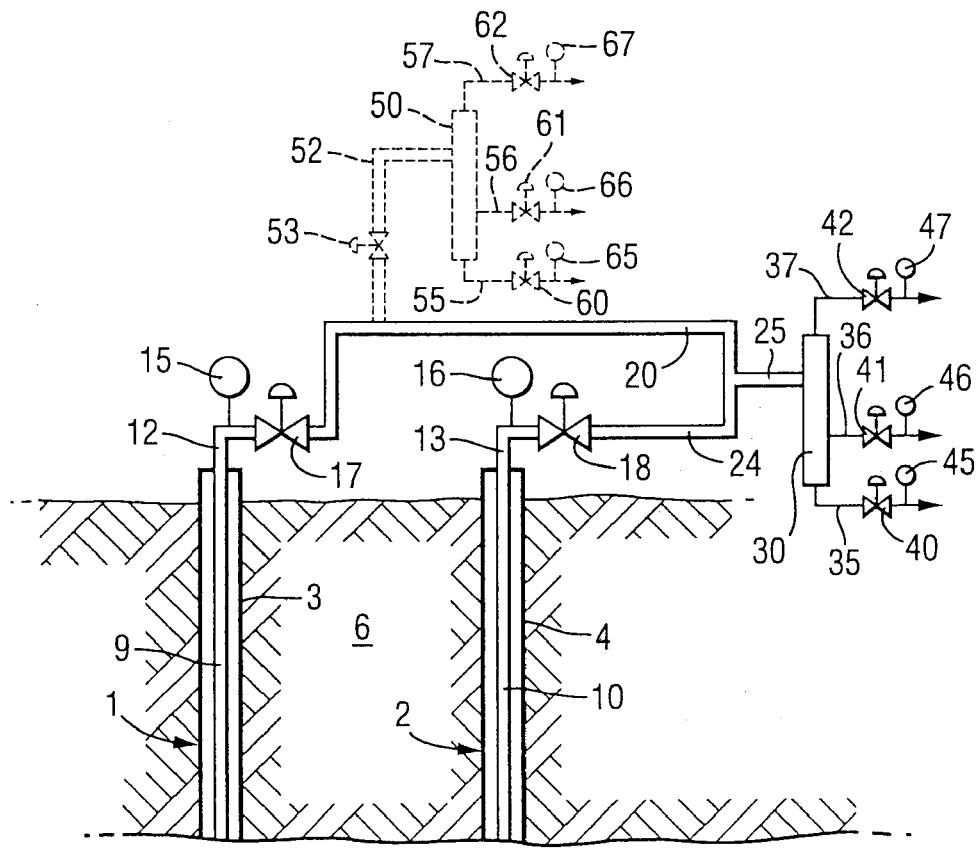
FIG. 1 schematically shows a production system according to the invention in which a multiphase fluid mixture comprising crude oil, water, natural gas and/or other fluids is produced by a cluster of two wells and transported via multiphase fluid transport pipelines to a bulk separator.

FIG. 1 schematically shows a crude oil and/or natural gas production system comprising a cluster of two wells 1 and 2.

The wells 1 and 2 comprise a casing 3 and 4 secured in a borehole in the underground formation 6 and tubing 9 and 10 extending from surface to an underground reservoir (not shown). The wells 1 and 2 further include a wellhead 12 and 13 provided with measuring and recording equipment 15 and 16 and a flow control valve 17 and 18.

The production system further includes a set of two multiphase well effluent transportation pipelines 20 and 24, called production flow lines, extending from the wellheads 12 and 13 to a production header 25, and a production separator 30.

The production separator 30 is provided with outlets for water, oil and gas, and the fluids are separately removed through discharge conduits 35, 36 and 37 respectively. Each discharge conduit 35, 36 or 37 is provided with a flow control valve, 40, 41 and 42, respectively and with flow metering devices, 45, 46 and 47 respectively. Optionally, the water and oil outlets can be combined.

Additionally there is provided a system for testing a well, which is shown in dashed lines. The test system comprises a test separator 50, having an inlet conduit 52 provided with a isolation valve 53, and outlet conduits 55, 56 and 57 provided with flow control valves 60, 61 and 62 and flow metering devices 65, 66 and 67. Optionally, the water and oil outlets can be combined, and other means of measuring the water proportion in the liquid flow can be used.

During normal operation, each of the two wells 1 and 2 is regularly tested in order to determine for each fluid stream a dynamic well production model. To this end the test separator 50 is brought into fluid communication with one well only, for example well 1, and well 2 produces as usual into the production separator 20. Well 1 is isolated from the production separator during testing.

Then the production variables, such as wellhead pressure and temperature, are measured and recorded for well 1 with the measuring and recording equipment 15. The commonly available real time or instantaneous measurements at each well preferably one or more of the following measurements: well tubing head or casing head or flow line or down hole pressures, temperatures, well choke valve positions, and measures of energy applied for artificial lift of the individual well flux, including lift gas or hydraulic fluid injection flows, electric submersible pump or beam pump power and so on. Then various ways are used to manipulate the well to test it under different conditions, for example by varying valves 17 and 62. The flow rates of water, flowing through outlet conduit 55, oil, flowing through outlet conduit 56 and gas, flowing through outlet conduit 57 are measured and recorded with flow metering devices 65, 66 and 67, respectively. Having carried out the measurements for the well 1, the test system is connected to well 2 (not shown) and well 1 produces as usual into the production separator 20. Well 2 is isolated from the production separator during testing.

Then similar measurements are taken for well 2. The measurements allow determining for each well i, i is 1 or 2 and for each fluid stream, water, oil or gas, a dynamic model or 'fingerprint' $y_i(t)$ of the well production which is represented as, $y_i(t)=f_i(u_{1i}(t), u_{2i}(t)\ldots)$, wherein $y_i(t)$ is the production of a fluid of well i, and wherein $u_{1i}, u_{2i}\ldots$ are the production variables of well i.

For example, if the production variable is the tubing head pressure (THP), the dynamic well production model for well i can have the form $y_i(t)=f(THP)$. Other production variables can be the gas flow rate, in case gas lifting enhances the well production.

We now have the dynamic well production models for the two wells 1 and 2 for each of the fluids, oil, water and gas, which are produced by the wells 1 and 2. Next production starts, and the test separator 50 is disconnected, and the well fluids flow through conduits 20 and 24 to the header 25 and from there to the production separator 30. In the absence of the test separator 50, the individual flow rates of the well fluids cannot be measured and the only measurements are the fluid flow rates in the discharge conduits 35, 36 and 37. Thus, for example if well 1 starts to produce water instead of a mixture of oil and water, the water flow rate in conduit 35 increases, but one cannot attribute the increased water amount to well 1.

In order to be able to calculate the contributions of the individual wells, use is made of the dynamic well production models. To this end the production variables $u_{1i}, u_{2i}\ldots$ of the wells i are measured in real time with the measuring and recording equipment 15 and 16. The individual well production of a fluid is calculated using the dynamic well production model for that well 1 and 2.

Simultaneously, the total production of each fluid stream, $y(t)$, is measured in real time with the flow metering devices, 45, 46 and 47. Then the dynamic well models are embedded in the total production of each fluid stream. In one embodiment, the well test includes perturbations around the normal operating point of the well, which well test is referred to as 'a deliberately disturbed well test' ('DDWT').

The cluster of wells may comprise a number of n wells (i), such that i=1, 2 . . . n, and the method may further comprise the steps of expressing the dynamic fingerprint/model for each well i as $y_i(t)=f_i(u_{1i}(t), u_{2i}(t)\ldots)$, wherein $y_i(t)$ is the multiphase fluid flow pattern of well i as monitored throughout the period of time (t) of the well test, $u_{1i}, u_{2i}\ldots$ are the dynamic measurements at well i that are determined during the well test, and f is the dynamic fingerprint/model/mathematical functional relating $y_i(t)$ to $u_{1i}, u_{2i}\ldots$;

expressing the estimated dynamic fluid flow pattern as $$y(t)_{estimated} \cong \sum_{i=1}^{n} \gamma_i y_i(t),$$

wherein $\gamma_i$ is the unknown weight coefficient;

expressing the monitored fluid flow pattern as $y(t)_{monitored}$;

comparing $y(t)_{monitored}$ with $y(t)_{estimated}$ and iteratively varying the weight coefficients $\gamma_i$ until $y(t)_{estimated}$ substantially equals $y(t)_{monitored}$ across the period under consideration—this a whole period reconciliation process between $y(t)_{monitored}$ and the estimates $y_i(t)$.

The product $\gamma_i y_i(t)$ then provides an accurate determination of the well i, and the updated dynamic fingerprint/model $\gamma_i f_i(u_{1i}(t), u_{2i}(t)\ldots)$ is used for real time estimates of the multiphase flux from well i. The dynamic fingerprint of each individual well $\gamma_i f_i(u_{1i}(t), u_{2i}(t)\ldots)$ may be constructed without preconceptions as to its underlying physical nature and purely from measured data. Its key components may include a static nonlinear part, a dynamic linear part and a time dependent part. A preferred embodiment uses fuzzy curve fitting for the static nonlinear part and subspace identification for the dynamic linear part. The purely data driven nature of the dynamic fingerprint is important for the sustainability and maintainability of the invention in the oil and gas production environment.

Embedding the dynamic well models in the total production comprises determining the unknown weight coefficients $\gamma_i$ in $$y(t) = \sum_{i=1}^{n} \gamma_i y_i(t).$$

Having determined the weight coefficients $\gamma_i$, the dynamic well model $f_i(t)$ is replaced by $\gamma_i f_i(t)$ and the calculation of the contributions of the individual wells and the step of measuring the total production and embedding is repeated.

According to the one embodiment of the invention, determining the unknown weight coefficients $\gamma_i$ comprises several steps. The first step is defining a sub-space S of the individual well productions $y_i(t)$, wherein S ⊂ X, X being a real inner product space. Then a sub-set in this sub-space is defined, comprising all admissible linear combinations of the separate productions. The weight coefficients are subsequently obtained by projecting the total production onto this set of admissible separate productions combinations.

In order to accept the calculated weight coefficients $\gamma_i$ they should satisfy a predetermined criterion. An example of such a criterion is for all values of i in the interval 1 through n $0 \leq \gamma_i \leq 1$, wherein $\gamma_i = 0$ means that well i is shut in and wherein $\gamma_i = 1$ means that well i is producing a fluid at the production calculated by the dynamic well model for that well and that fluid.

If the calculated weight coefficients satisfy the predetermined criterion, then the weight coefficients are accepted. However, in case the calculated weight coefficients do not satisfy the predetermined criterion, acceptable weight coefficients must be calculated.

Figure 2:
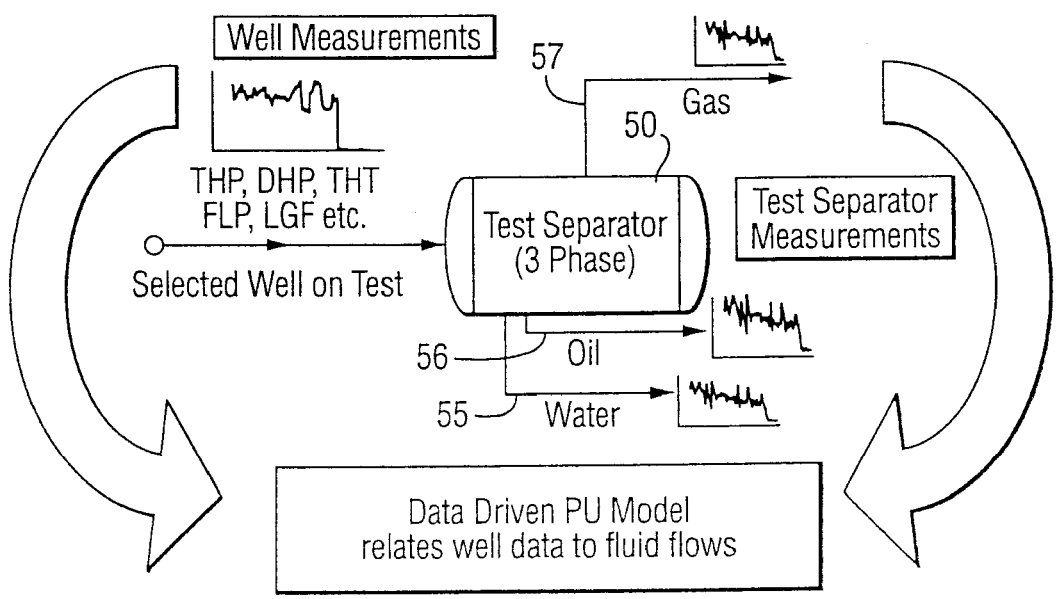
FIG. 2 schematically shows how a dynamic fingerprint, or in other words, a well model, is built from well production data gathered during a deliberately disturbed well test ('DDWT')
Figure 3:
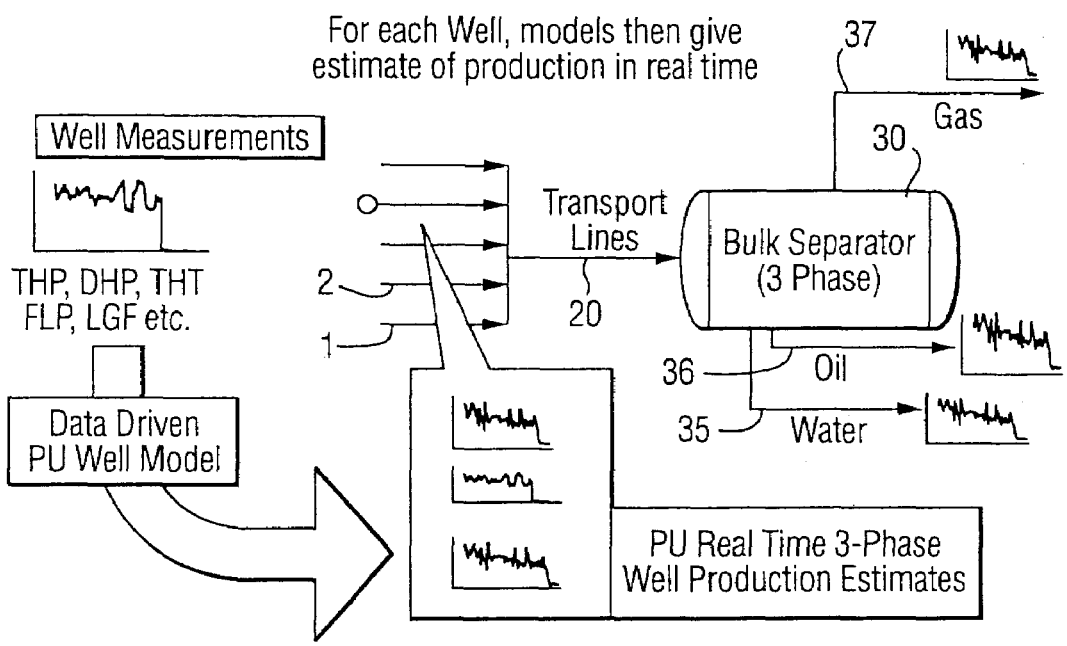
FIG. 3 schematically shows how in the method according to the invention preliminary estimates are made of the crude oil, water and gas production patterns on the basis of the well models shown in FIG. 2.
Figure 4:
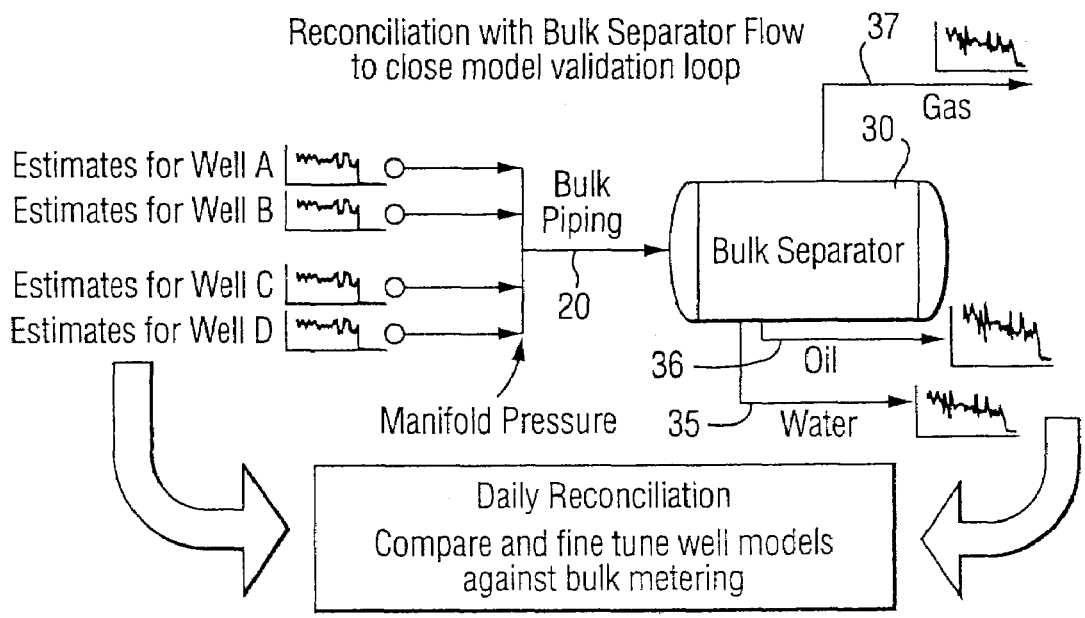
FIG. 4 shows how the estimates shown in FIG. 3 are reconciled daily or at other selected intervals by comparing the preliminary estimates with the actual single-phase streams emerging from the bulk separator(s).

FIGS. 2, 3 and 4 provide graphical representations of the method according to the invention, which method is also referred to as 'Production Universe' or 'PU'. Production Universe is a Shell trademark.

The Production Universe (PU) Real Time Production Monitoring system according to the invention generates and provides accurate estimates of well production in the following way:

I: Build Models from Well Test Data.

The PU models relate oil, water and gas flow trends measured at the test separator outlets to the well instrumentation measurement trends over the same period.

II: Incorporate Historical Data and Trends.

The models are computed based not just on latest well test data but also on historic well test data to capture longer term well production trends.

III: Use Models to Estimate Flows in Real Time.

In normal operation, PU provides estimates of well oil, water and gas production for each individual well based on its models and the real time well instrumentation measurements.

IV: Reconcile Estimates Against Bulk Measurements.

The PU preliminary estimates for each well are then reconciled/validated at fixed intervals by comparing with the actual production measurements as available.

Each of the above steps is described in more detail herein below.

I: Build Models from Test Data

As illustrated in FIG. 2 PU builds PU models from well test data. A well test is when a single well produced into a single separation facility 50 (e.g., a test separator as also illustrated in FIG. 1) and the single-phase outlet flows (oil, water, gas) of the separator 50 are measured. The PU models relate oil-water-and gas flow trends measured at the test separator outlets 56, 55, 57 to the well instrumentation measurement trends over the same period. The well instrumentation measurements can include pressure, differential pressure, temperature, and gas lift injection rate.

The well tests preferably include step changes to the flow regime of the well (multi-rate well testing). This is to allow PU to capture the dynamics of the well and entire (static) operating envelop of the well.

Well tests can also be conducted with more than one well at a time, or while wells are in production, as long as at least one well has been fully characterised.

Each well has a PU well model. The PU model relates the measurement trends of the well to production of the well and is set up from the well test data. Hence PU models are data-driven.

The PU models have two main components:

A: A static non-linear part, which is based on a fuzzy curve fitting approach. This approach is described chapter 2 of the book "Fuzzy Modelling and Control" by Jairo Espinosa (PhD thesis Katholieke University Leuven, Faculty of Electrical Engineering, April 2001-ISBN: 90-5682-303-5); and B: A dynamic linear part, which is based on the so-called sub-space identification approach. This approach is based on algorithm 3 described on page 128 of the book "Sub-space Identification for Linear Systems" by Peter Van Overschee and Bart De Moor. Kluwer Academic Publishers, 1996-ISBN: 0-7923-9717-7).

Multiple fallback models are made available to ensure robustness of the application in the presence of instrumentation failure.

II: Incorporate Historical Data and Long Term Trends

The PU well models as described above are also augmented to characterise the long-term characteristics of the wells.

This is achieved by taking into account the effects of time dependent decline or increase factors on the production of the wells.

III: Use Models to Estimate Flows in Real Time

During normal production operations (which typically occur during about 95% of the life cycle time for each well), all the wells in a station produce into a common bulk separation facility and only the co-mingled outlet single phase flows of oil, water and gas are measured. PU gives estimates of well oil, water and gas production for each individual well based on its models and the real time well instrumentation measurements.

IV: Reconcile Estimates Against Bulk Measurements.

The PU preliminary estimates for each well are then reconciled and/or validated at fixed intervals by comparing with the actual bulk production measurements if they are available.

Generally, more than one well will be producing onto a bulk separator 30. The separator 30 will separate the production into two or three components: oil, water and gas, or liquids and gas and these will be measured. The PU estimates of each well 1, 2 will sum up to give the PU estimated oil, water and gas trends for the total production of the station over the chosen reconciliation interval. These trends will be compared with the measured outlet flow trends of the bulk separator 30. Given a sufficient variation of the PU individual well trends, PU then computes individual reconciliation factors for each well 1, 2 so that the trends for each well provide best fits (in the mathematical sense) to the measured bulk production trends. This ensures that the PU accurately tracks measured production and provide a validation tool for the PU models.

In the next section of the description an explanation is provided how during a well test, specifically a Deliberately Disturbed Well Test (DDWT) a dynamic model can be identified that is used to predict the production of the well under production circumstances.

Two methods are discussed in this section below to adapt the performance of the well models to production circumstances.

In oil and gas production operations, the production of the different wells is not measured individually. Instead the sum production of a group of wells producing in a piece of tubing called the header is measured at the output of the bulk separator that is connected to the header. The reason for this is cost: measuring the production at each individual well would mean the installation—and maintenance—of a multitude of two- or three phase flow meters. However, for a proper management of the production unit, it is necessary to have the individual well productions available, and basically at the same sampling rate as other process quantities that are measured, such as Tubing Head Pressure, Flow Line Pressure and Lift Gas Rate.

In order to, at least partially, repair this shortcoming, a well is put on test, i.e. it is disconnected from the bulk separator 30, and connected to the test separator 50 as shown in FIGS. 1 and 2.

The production for the well can now be measured directly at the output of the test separator 50, which is usually well instrumented. While the well is on test, a PU well model is identified. A PU well model is a mapping between quantities that are interpreted as inputs to the well and output from the well, i.e. the production rate of the well, measured at the test separator. The quantities that are used as inputs during the test are also available when the well is back in production. By processing these inputs during production with the identified well model estimates are obtained of the production rate of the well.

During production operations a lot of events are happening that introduce changes in the operating points of the different wells. These production circumstances are imitated during the well test by introducing deliberate changes; this way of well testing has been introduced during the development of the Production Universe or 'PU'. In this way the 'PU' well model covers a certain dynamic range rather than the production in one operating point as resulted from traditional well testing. Although a large improvement, it still does not bridge the gap completely between test- and production circumstances. There are two reasons for this:

1. The interaction between the wells 1, 2 etc. cannot be taken on board during the test, as the well is excommunicated from the other wells of its header group, and hence these interactions are also not represented in the identified PU well model.
2. The test separator 50 operates under a higher pressure than the bulk separator 30, because the output of the test separator usually produces to the input of the bulk separator 30.

In the next section two methods are described for adapting the PU well models to the production circumstances. These methods are referred to as Reconciliation and Decomposition.

1 Reconciliation

All quantities considered in this section are functions of time over some finite time interval; specifically they may be time series of finite length. In any case they can be considered to be elements of an inner product space $\mathbb{X}$.

Consider n wells, and denote the estimated production rate of each well by $$y_i, (i=1,\ldots,n) \qquad (1)$$

Then PU obtains the estimated productions by processing the inputs for each well with the corresponding well model.

In an idealized situation the total production from a cluster of wells is given by:

$$y = \sum_{i=1}^{n} y_i \qquad (2)$$

In particular because of the discrepancies between test- and production circumstances mentioned above, and in addition because of uncertainties caused by measurement errors, a more realistic result would be that the linear combination $$\tilde{y} = \sum_{i=1}^{n} \gamma_i y_i \quad (\gamma_i \in \mathbb{R}) \qquad (3)$$

is 'close'—to be made precise later—to y. It can of course not be inferred directly what the values of the coefficients operating on the separate productions in equation (3) are. Indeed, denoting the set of the separate productions by $$\mathbb{Y} = \{y_1, \ldots, y_n\} \qquad (4)$$

the approximant in equation (3) may be any member of the set of all linear combinations of the separate productions $$\mathrm{span}(\mathbb{Y}) = \left\{ y \in \mathbb{X} \mid y = \sum_{i=1}^{n} \gamma_i y_i, y_i \in \mathbb{Y}, \gamma_i \in \mathbb{R} \right\} \qquad (5)$$

Now assume that it has been successful to find an element of set of all linear combinations in equation (5) that is 'closest' to the total production. Because the only restriction on coefficients in the linear combination is that they are real numbers, one may very well end up with a typical 'closest' element that looks like this:

$$\tilde{y} = 50 y_1 - 120 y_2 + \ldots + 2 y_n \qquad (6)$$

However, that result would physically be incorrect. Typically, there is this discrepancy between the test- and the production circumstances, but not in the sense that the contribution from well 1 during production would be fifty times its performance during testing. And then consider a negative contribution, such that the production from well 2 flows back into the reservoir, and at a rate hundred-and-twenty times faster than its rate during testing.

So if it is aimed to acknowledge the physical premises of our problem, the set in equation (5) is clearly too large to serve as a stock for closest approximant candidates for the total production.

A useful subset of this set in this vein can be constructed by restricting the admissible values for the coefficients in equation (4). Obviously it is aimed that the contribution to the total production is non-negative. The collection of all non-negative combinations of the set in equation (4) form a special, convex subset of that of equation (5) called the conical hull of the set (4):

$$con(\Upsilon) = \left\{ y \in \mathbb{X} \mid y = \sum_{i=1}^{n} \gamma_i y_i, y_i \in \Upsilon, \gamma_i \in \mathbb{R}^+ \right\} \quad (7)$$

The above equation expresses the fact that the coefficients operating on the separate productions are elements of the set of non-negative real numbers. There will be no doubt that the contributions of the separate wells to the total production will not be much larger than the production measured during production. In view of the higher backpressure of the test separator 50 compared to that of the bulk separator 30, the following maximal contribution from the wells during production may be expected $$y_{\max} = \sum_{i=1}^{n} \alpha_i y_i \quad (8)$$

where ideally the coefficients in (8) would be 1, but in view of the uncertainties in the well model they are allowed to be slightly larger than 1, such as 1.1. The collection of all combinations of the set (4) bounded above by the maximal contribution of (8) constitutes again a convex subset of equation (5); specifically it is a translate of the set given in equation (7).

Of course the aim is to look for combinations that are both non-negative and bounded above:

$$\mathbb{H} = (con(\Upsilon)) \cap (y_{\max} - con(\Upsilon)) = \left\{ y \in \mathbb{X} \mid y = \sum_{i=1}^{n} \gamma_i y_i, 0 \le \gamma_i \le 1 \right\} \quad (9)$$

The above set, being the intersection of two convex sets, is itself convex; it may be interpreted as a mathematical representation of the header.

Then the aim is to look for those elements in this set that are 'closest' to the total production. A natural choice for 'closest' in our present setting would be that element in the set (9) that gives the smallest 'size' of its difference with the total production, where 'size' is more formally the norm of the ambient inner product space.

Such an element is called the best approximation to the total production from the header set (9). In the present setting this best approximation is unique.

So the result is $$P_H(y) = \hat{y} = \sum_{i=1}^{n} \hat{\gamma}_i y_i \quad (0 \le \hat{\gamma}_i \le 1) \quad (10)$$

The interpretation of equation (10) is that best approximation is that part of the total production that can be 'explained' by the separate productions.

The coefficients in (10) are called the reconciliation factors, and this process where a weighted combination of the separate productions are considered, is called reconciliation. In terms of the well models this result means that their static gain is proportionally corrected by the reconciliation coefficients. This will certainly improve the well model, in the sense that it is more 'fit for purpose' in relation with the production circumstances.

Interactions between the wells in the production circumstances will to a large extent cause the mismatch between test- and production circumstances for the wells. However corrections in the static gains of the well models do not represent properly this mismatch. This means that after a number of reconciliations the well has to be re-tested.

In the next section a new approach, called the 'Algebraic Oil' development, is described that does describe the mutual interactions between the wells. The approach of this section can be applied as a real-time fine-tuning of the representation of the total production described in the next section.

2: Decomposition

The mathematical setting for all previous developments has been that of a Vector Space, i.e. a scalar multiplication is defined operating on the elements of interest, notably in this case the productions, and where the scalars in this multiplication are real-, or possibly complex numbers. From an algebraic point of view real-, and complex numbers are elements of a Field. This setting is the simplest algebraic structure that can be used in this connection. It is unlikely that natural phenomena, like oil production, are covered entirely by this simple structure. Generalizations of these Vector Spaces are Modules, in which the 'scalars' are allowed to be elements from an arbitrary Ring, and in the present context a Polynomial Ring. This context enables not only the interactions between the wells to be described explicitly, but as a consequence of this, gives moreover a strategy to influence the Ultimate Recovery of a reservoir.

Thus let the total production, and the separate productions be elements of a Polynomial Ring $$y, y_1, \ldots, y_n \in \mathbb{R}[u_1, \ldots, u_m] \quad (11)$$

The m variables or indeterminates are sent by an evaluation homomorphism to—the values of—the inputs as in the previous section. Whereas the dual character of a polynomial as an element of a Ring and as a mapping is formally well known, its full consequences are much less explored. Indeed, the results presented here may be associated with a new branch in Mathematics, for which the name 'Approximate Commutative Algebra' is coined, since this emphasizes the intersection between Approximation Theory and Commutative Algebra.

An important subset of a Polynomial Ring is an Ideal—see for instance David Cox, John Little, and Donal O'Shea, 'Ideals, Varieties, and Algorithms', Springer, second edition, 1997:

$I \subset \mathbb{R}[u_1, \ldots, u_m]$ is an Ideal if it satisfies:

(1) $0 \in I$ (2) If $y, z \in I$, then $y + z \in I$ (3) If $y \in I$ and $g \in \mathbb{R}[u_1, \ldots, u_m]$, then $gy \in I$     (12)

The Ideal generated by the separate productions is given by:

$$< y_1, \ldots, y_n > = \left\{ \sum_{i=1}^{n} g_i y_i \;\middle|\; g_1, \ldots, g_n \in \mathbb{R}[u_1, \ldots, u_m] \right\} \quad (13)$$

An important operation is taking the Radical of an Ideal:

The Radical of $I$, denoted by $\sqrt{I}$ is the set $\sqrt{I}=\{y|y^k \in I$ for some integer $k \geq 1\}$ (14)

For the total production in terms of the separate productions it holds that:

$$y \in \langle y_1, \ldots, y_n \rangle = \langle y_1 \rangle + \langle y_2 \rangle + \ldots + \langle y_n \rangle \quad (15)$$

In view of equation (13), a Decomposition of the total production is given by $$y \approx \sum_{i=1}^{n} g_i y_i \quad (16)$$

$$g_i \in \mathbb{R}[u_1, \ldots, u_m]$$

On comparing this equation with equation (3), it follows that in approximating the total production the coefficients in the last equation have been replaced by polynomials. These polynomials may depend on all variables involved. To be specific the polynomial operating on the production from, say, the first well may, apart from variables associated with the first well, depend on variables associated with the other wells. Moreover they may depend on variables associated with measurements performed in the sub-surface, whereas in particular the total production is associated with a measurement performed at a separator, which is at the surface. This means that the 'polynomial coefficients' in the approximation of the total production in equation (16) express both the interrelationships between the producing wells and the surface ⇔ sub-surface relationship.

A representation can be given for the contribution of a well to the total production. Under the assumption that the total production equals the production from a single well when all other wells are closed in, the following results holds:

$$g_i - 1 \in \sqrt{\langle y_1, \ldots, y_{i-1}, y_{i+1}, \ldots, y_n \rangle} \quad (17)$$

From this it follows that the above-mentioned representation is:

$$g_i y_i = y_i - \sum_{j \neq i} h_j y_j y_i \quad (18)$$

$$h_j \in \mathbb{R}[u_1, \ldots, u_m]$$

The following result stresses the fact that the separate productions do in general NOT sum up to the total production:

$$y - (y_1 + \ldots + y_n) \in \sqrt{\langle \{y_i y_j | i \neq j \text{ and } i,j \in \{1,\ldots,n\}\} \rangle} \quad (19)$$

These results can be combined with approaches to 'physical' polynomial representations for the productions from the data, along the lines of Kepler and Gauss in their construction of the planet orbits around the sun. More specifically, the productions can be regarded to be members of Ideals generated by variables associated by physical mechanisms. An example of such a variable is the following one, associated with the Tubing Head Pressure (THP) and the Flow Line Pressure (FLP) of a well:

$$u = \sqrt{(THP-FLP)FLP}$$

Using these results, the polynomials can be 'constructed' from the data through an application of Approximate Commutative Algebra.

Finally two important consequences are presented of this approach using Modules, rather than Vector Spaces. Firstly, another interpretation of equation (16) with respect to the individually considered separate well productions is that the tuple of well productions is 'deformed' by moving from the 'test situation' where each of them is not influenced by their neighbours to the 'production situation' where their productions have changed—not necessarily decreased—to the contributions (18) as a result of the interrelationships.

The complete, 'continuous' path between these two situations is a Homotopy see for instance Allen Hatcher, 'Algebraic Topology', Cambridge University Press, 2002. Constructing this Homotopy from the data—using a combination of numerical—and symbolic calculations—gives direct information about starting-up sequences of production units.

Secondly, it has been assumed tacitly that the above-described algebraic approach has been applied to data that can be associated to a 'short-term' time scale. By on the one hand transforming the production representations associated with the 'short-term' time scale to a 'medium- or long-term' time scale, notably through application of Time Scale Calculus—see Martin Bohner and Allan Peterson, 'Dynamic Equations on Time Scales', Birkha"user, 2001—and by on the other hand applying the algebraic approach directly to data associated with a medium- or long-term time scale, the relation between these two representation can again be cast into the framework of a Continuous Deformation Retract. This time the change in interrelationships described by the continuous deformation gives direct information about the redistribution of the fluids in the sub-surface. This means a new method for Forecasting, whereas the description of the redistribution also gives a recipe for changing it, in other words for influencing the Ultimate Recovery of crude oil and/or gas from an oil and/or gas field.

What is claimed is:

1. A method for determining multiphase fluid streams flowing from individual wells of a cluster of crude oil, gas or other fluid production wells, wherein the fluid streams produced by the individual wells are commingled and routed via a fluid separation assembly into fluid outlet conduits for transportation of at least partly separated streams of crude oil, gas or other fluids; the method comprising:

arranging a flowmeter at each fluid outlet conduit;

producing oil or gas from the cluster of wells and monitoring a dynamic fluid flow pattern of the accumulated multiphase stream of well effluents produced by the cluster of wells by means of the flow meters;

performing a series of well tests during which production from a tested well is varied and production from other wells is maintained substantially constant or interrupted;

monitoring during each well test a dynamic fingerprint of the variation of the flow pattern of effluents produced by the tested well;

assuming that an estimated dynamic flow pattern is an accumulation of said dynamic fingerprints that are multiplied by unknown weight coefficients;

determining the unknown weight coefficients by iteratively varying each weight coefficient until the estimated dynamic fluid flow pattern substantially matches with the monitored dynamic fluid flow pattern; and using the determined weight coefficients to produce real-time estimates of the multiphase flux from at least one well.

2. The method of claim 1, wherein the cluster of wells comprises a number of n wells (i), such that $i=1, 2, \ldots n$, and the method further comprises the steps of expressing the dynamic fingerprint for each well as i=i 1i, 2i . . . ), wherein i is the multiphase fluid flow pattern of well as monitored throughout the period of time (t) of the well test, and 1i 2i are the production variables of well that are determined during the well test;

expressing the estimated dynamic fluid flow pattern as $$y(t)_{estimated} \cong \sum_{i=1}^{n} \gamma_i y_i(t),$$

wherein $\gamma_i$ is the unknown weight coefficient;

(d) expressing the monitored fluid flow pattern as $y(t)_{monitored}$;

(e) comparing $y(t)_{monitored}$ with $y(t)_{estimated}$ and iteratively varying the weight coefficients $\gamma_i$ until $y(t)_{estimated}$ substantially equals $y(t)_{monitored}$.

3. The method according to claim 2, wherein a mathematical reconciliation process obtains the weight coefficients $\gamma_i$.

4. The method of claim 3, wherein the reconciliation process comprises the steps of:

defining a function space S of the individual well productions $y_i(t)$ wherein $S \subset X$, X being a real inner product space;

obtaining the header set consisting of all allowable linear combinations of the separate productions;

obtaining the weight coefficients by evaluating an analytical expression for the best approximation to the total production from the header set.

5. The method of claim 2, wherein the estimated dynamic fluid flow pattern is cast in an algebraic structure of modules, giving a decomposition process in which weight coefficients are expressed as weight functions that model both the inter-relationships between the wells and the surface and sub-surface relationship.

6. The method of claim 5, where the change from the test situation to the production situation gives starting sequences for production units.

7. The method of claim 5, wherein casting the estimated dynamics fluid flow pattern in terms of medium and long-term time scales, gives a method for forecasting, and a strategy to influence the Ultimate Recovery of crude oil and/or gas from a crude oil or gas field.

8. The method of claim 1, wherein during the well test the flow regime of the tested well is stepwise varied to monitor a static and a dynamic part of an operating envelope of the tested well and wherein said dynamic fingerprint is obtained from a well model which converts data from the static part of said envelope by a fuzzy curve fitting approach and which converts data from the dynamic linear part of said envelope by a sub-space identification approach.

9. A system for monitoring a multiphase fluid stream flowing from a cluster of crude oil, gas or other fluid production wells via a fluid separation assembly into a plurality of fluid outlet conduits for transportation of at least partly separated streams of crude oil, natural gas or other fluids; the system comprising:

a flow meter for monitoring fluid flux in each fluid outlet conduit;

means for storing a dynamic fluid flow pattern of the accumulated multiphase fluid stream produced by the cluster of wells as monitored by the flow meters;

means for performing a series of well tests during which production from a tested well is varied and production from other wells is maintained substantially constant or interrupted;

memory means for monitoring during each well test a dynamic fingerprint of the variation of production variables of the tested well;

processor means which take into account that an accumulated fluid stream produced by the cluster of wells has a dynamic flow pattern which is an accumulation of said dynamic fingerprints that are multiplied by unknown weight coefficients; and processor means for determining the unknown weight coefficients by iteratively varying each weight coefficient until the assumed dynamic fluid flow pattern substantially matches with the monitored dynamic fluid flow pattern.

10. The system of claim 9, wherein the cluster of wells comprises a number of n wells (i), such that i=1, 2 . . . n, and the processor means carry out the steps of:

expressing the dynamic fingerprint for each well as i=i1i, 2i . . . ), wherein i is the multiphase fluid flow pattern of well as monitored throughout the period of time (t) of the well test, and 1i 2i are the production variables of well that are determined during the well test;

expressing the estimated dynamic fluid flow pattern as $$y(t)_{estimated} \cong \sum_{i=1}^{n} \gamma_i y_i(t),$$

wherein $\gamma_i$ is the unknown weight coefficient;

expressing the monitored fluid flow pattern as $y(t)_{monitored}$;

comparing $y(t)_{monitored}$ with $y(t)_{estimated}$ and iteratively varying the weight coefficients $\gamma_i$ until $y(t)_{estimated}$ substantially equals $y(t)_{monitored}$.

11. The system according to claim 10, wherein a mathematical reconciliation process obtains the weight coefficients $\gamma_i$.

12. The system of claim 11, wherein the reconciliation process comprises the steps of:

defining a function space S of the individual well productions $y_i(t)$ wherein $S \subset X$, X being a real inner product space;

obtaining the header set consisting of all allowable linear combinations of the separate productions;

obtaining the weight coefficients by evaluating an analytical expression for the best approximation to the total production from the header set.

13. The system of claim 11, wherein the estimated dynamic fluid flow pattern is cast in an algebraic structure of modules, giving a decomposition process in which weight coefficients are expressed as weight functions that model both the inter-relationships between the wells and the surface and sub-surface relationship.

14. The system of claim 13, where the change from the test situation to the production situation gives starting sequences for production units.

15. The system of claim 13, wherein casting the estimated dynamics fluid flow pattern in terms of medium and long-term time scales, gives a method for forecasting, and a strategy to influence the Ultimate Recovery of crude oil and/or gas from a crude oil or gas field.

16. The system of claim 10, wherein during the well test the flow regime of the tested well is stepwise varied to monitor a static and a dynamic part of an operating envelope of the tested well and wherein said dynamic fingerprint is obtained from a well model which converts data from the static part of said envelope by a fuzzy curve fitting approach and which converts data from the dynamic linear part of said envelope by a sub-space identification approach.

* * * * *